United States Patent [19]

McCool et al.

[11] Patent Number: 4,951,280
[45] Date of Patent: Aug. 21, 1990

[54] METHOD AND APPARATUS FOR CONFIGURING DATA PATHS WITHIN A SUPERNET STATION

[75] Inventors: John F. McCool, Cupertino; Rajiv V. Limaye, Santa Clara, both of Calif.

[73] Assignee: Advanced Micro Devices, Inc., Sunnyvale, Calif.

[21] Appl. No.: 281,991

[22] Filed: Dec. 9, 1988

[51] Int. Cl.[5] .............................................. H04J 3/14
[52] U.S. Cl. ............................. 370/85.12; 370/85.14; 340/825.05; 340/825.51
[58] Field of Search ............... 370/85.12, 85.14, 85.15, 370/85.9; 340/825.05, 825.5, 825.51

[56] References Cited

U.S. PATENT DOCUMENTS

| | | | |
|---|---|---|---|
| 4,527,270 | 7/1985 | Sweeton | 370/85.12 |
| 4,547,879 | 10/1985 | Hamelin et al. | 370/85.12 |
| 4,670,873 | 6/1987 | Cour et al. | 370/85.12 |
| 4,696,001 | 9/1987 | Gagliardi et al. | 370/85.12 |

Primary Examiner—Douglas W. Olms
Assistant Examiner—Min Jung
Attorney, Agent, or Firm—Flehr, Hohbach, Test, Albritton & Herbert

[57] ABSTRACT

A modular system for configuring and reconfiguring the data paths within a local area network station permits the network station to be configured in various operational modes including a through mode, a wrap mode, and a concentrator mode. A module includes a media access controller MAC and an encoder/decoder ENDEC connected together by a bus. Certain signals from the bus are selected by a multiplexer. External signals for example, from another module are inputted to the bus through a latch. The multiplexer and the data paths through the MAC and ENDEC are controlled to configure the station in one of the operational modes. A second module similar to the first module is used to provide a station for a dual-ring local area network conforming to the FDDI standard.

20 Claims, 15 Drawing Sheets

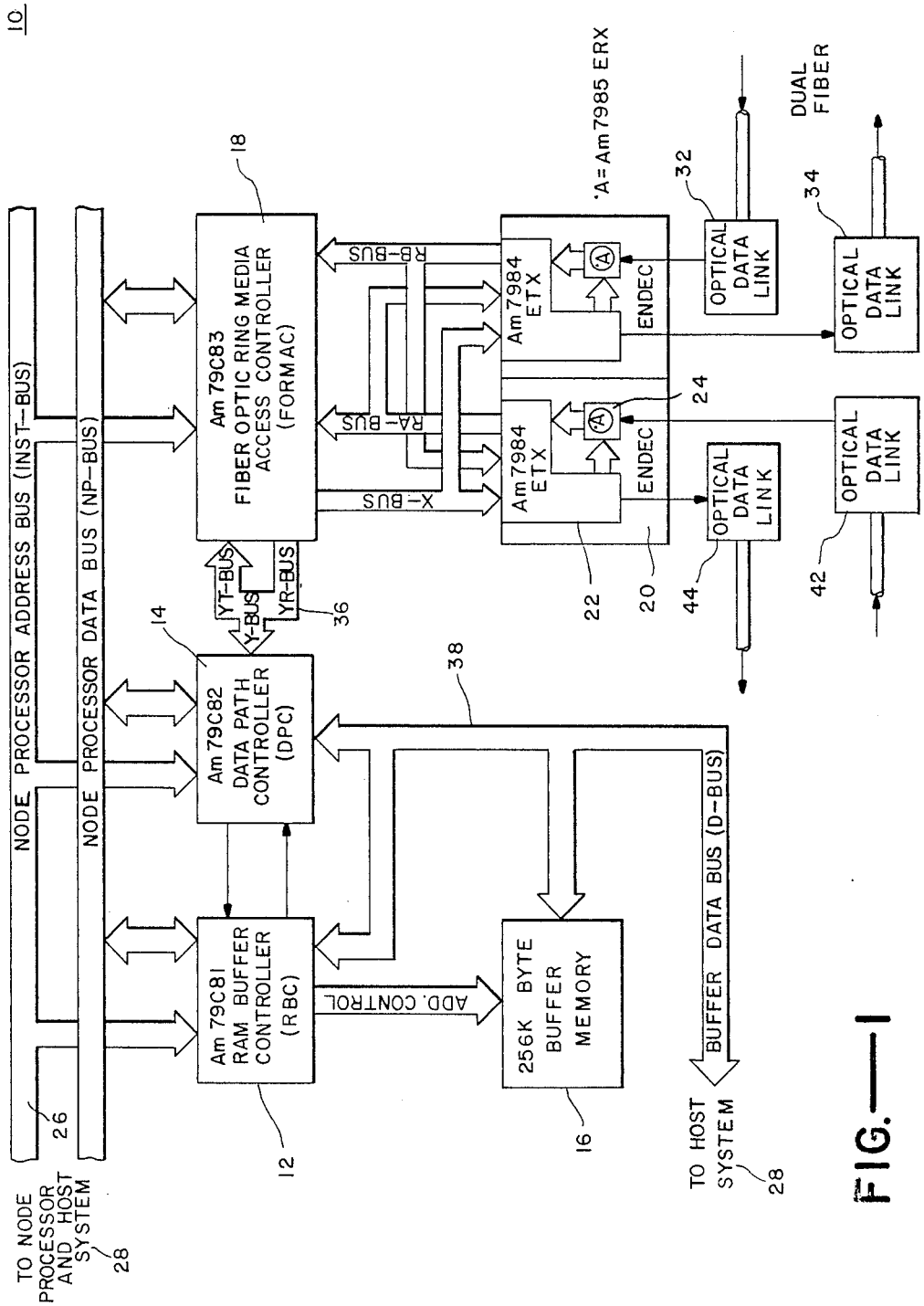
FIG.—1

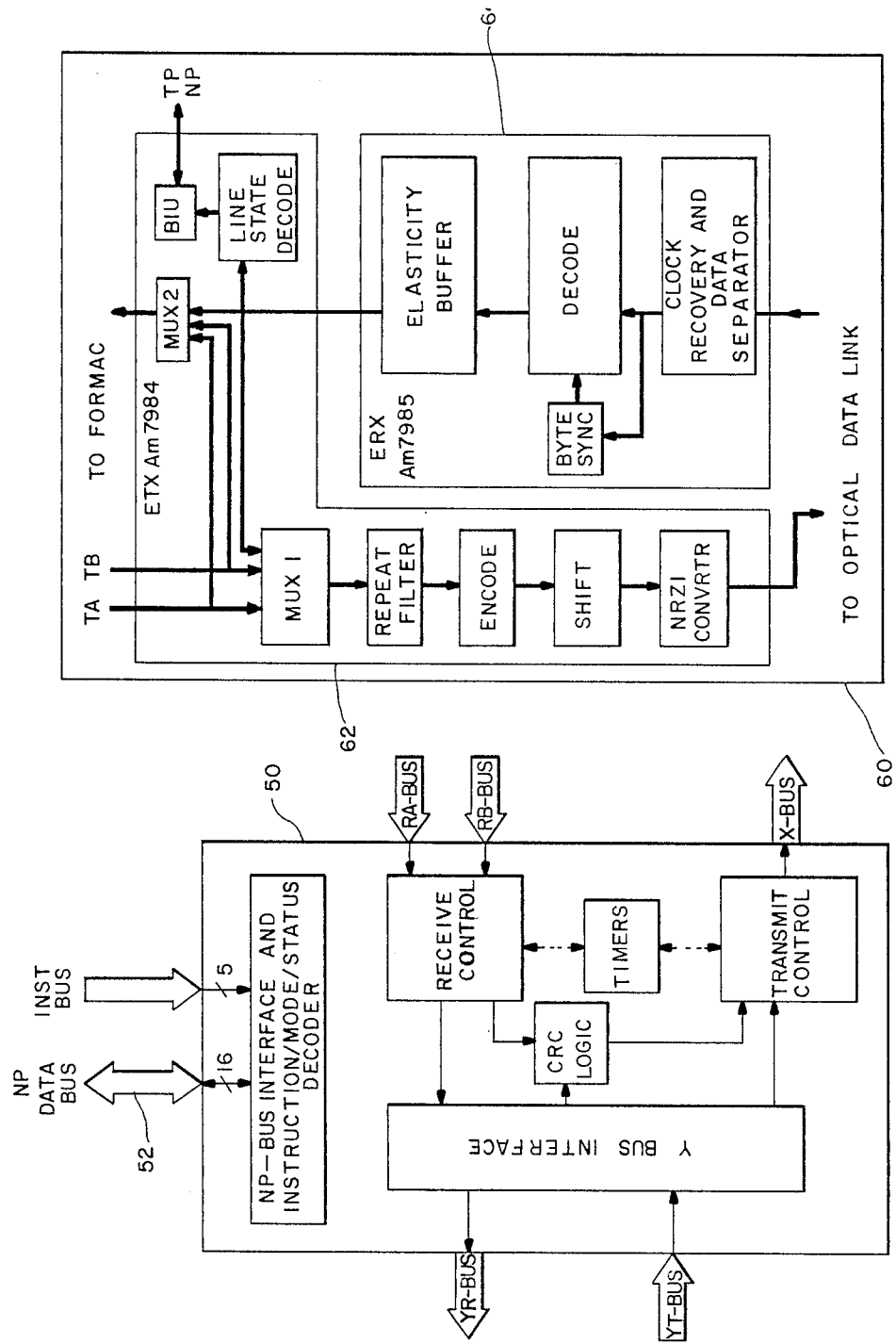

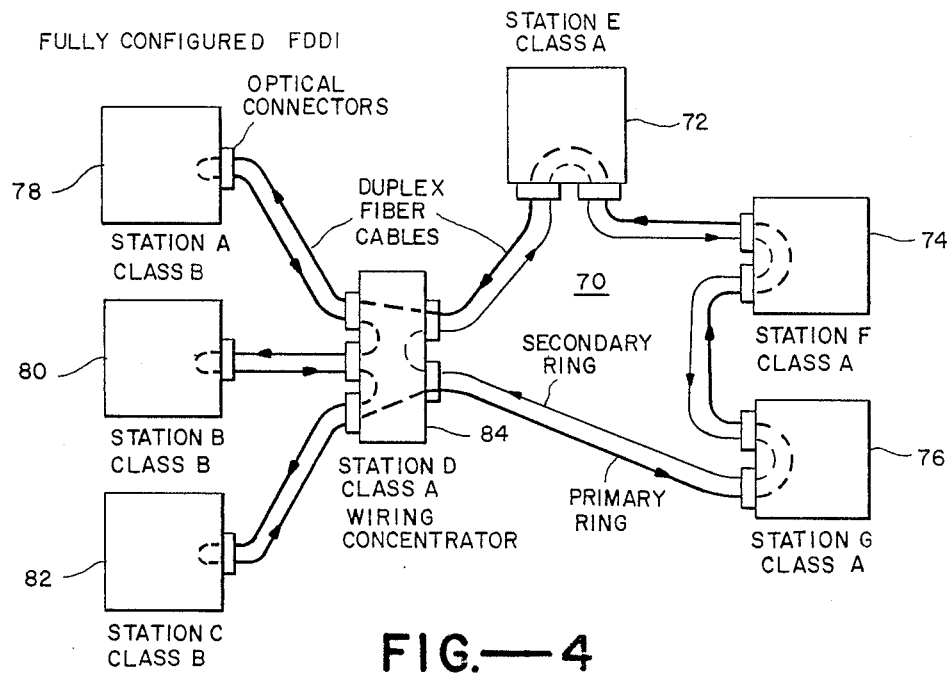
FIG.—4
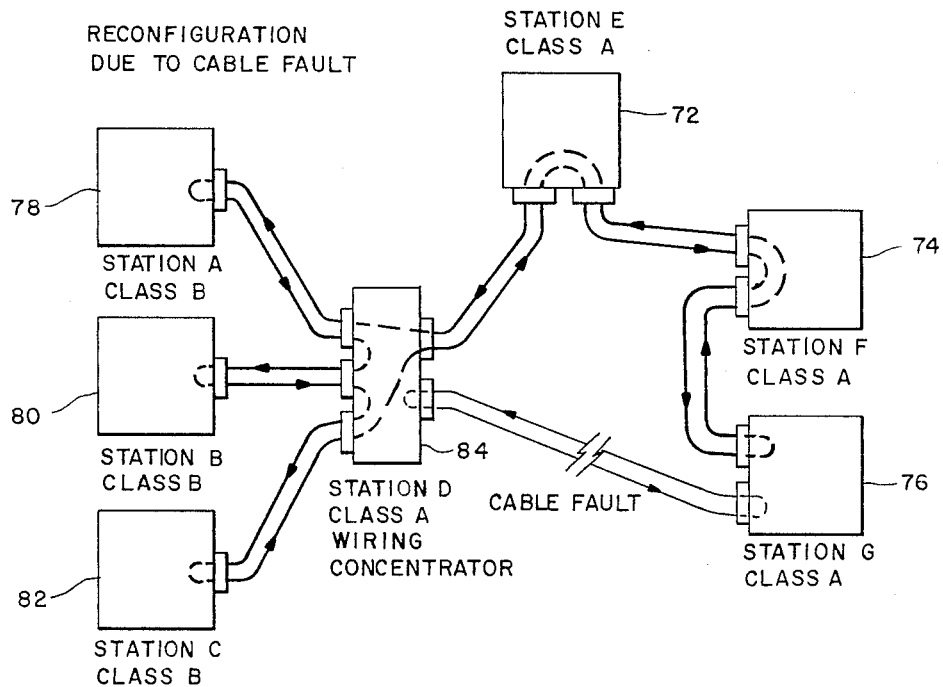
FIG.—5

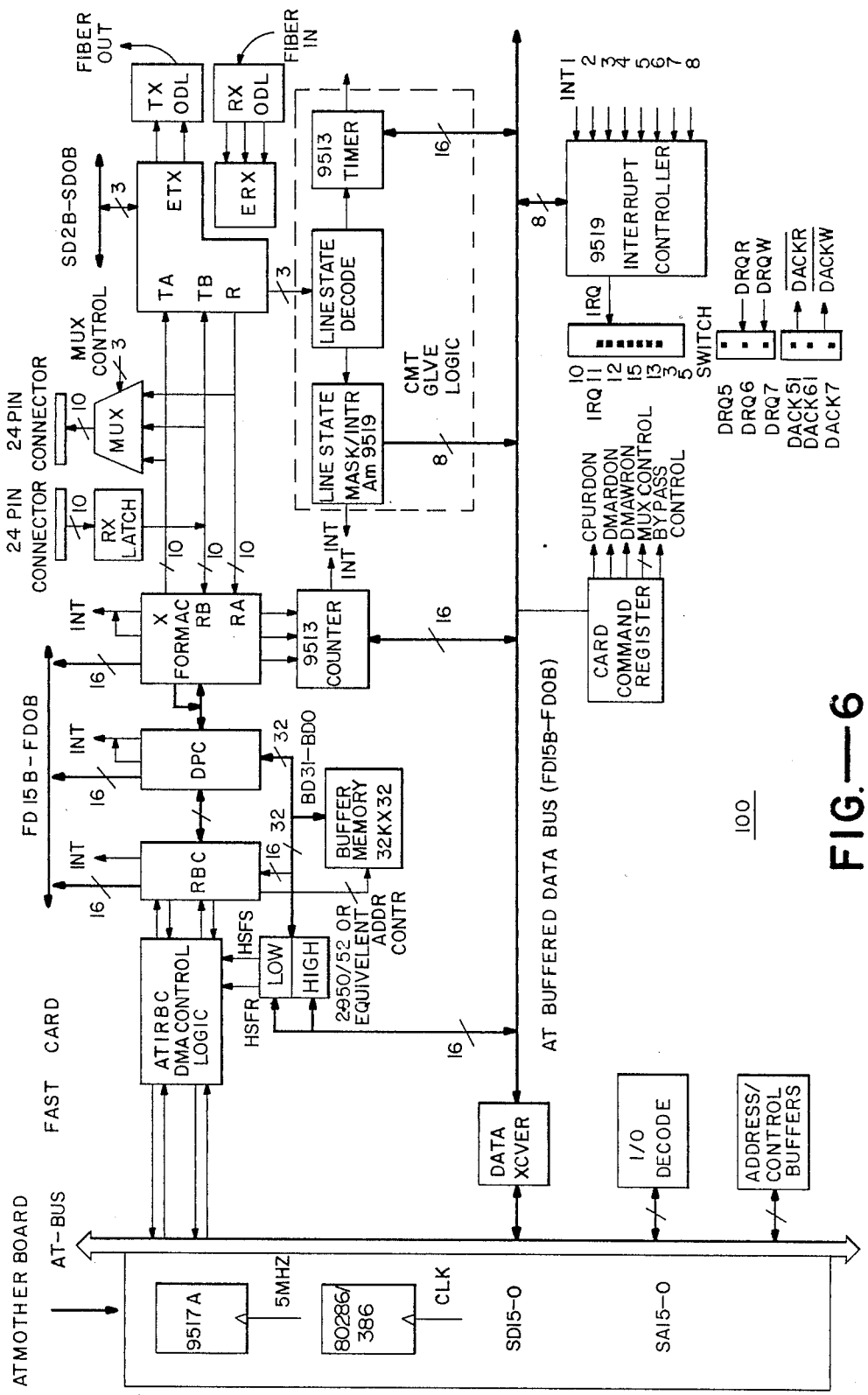
FIG.—6

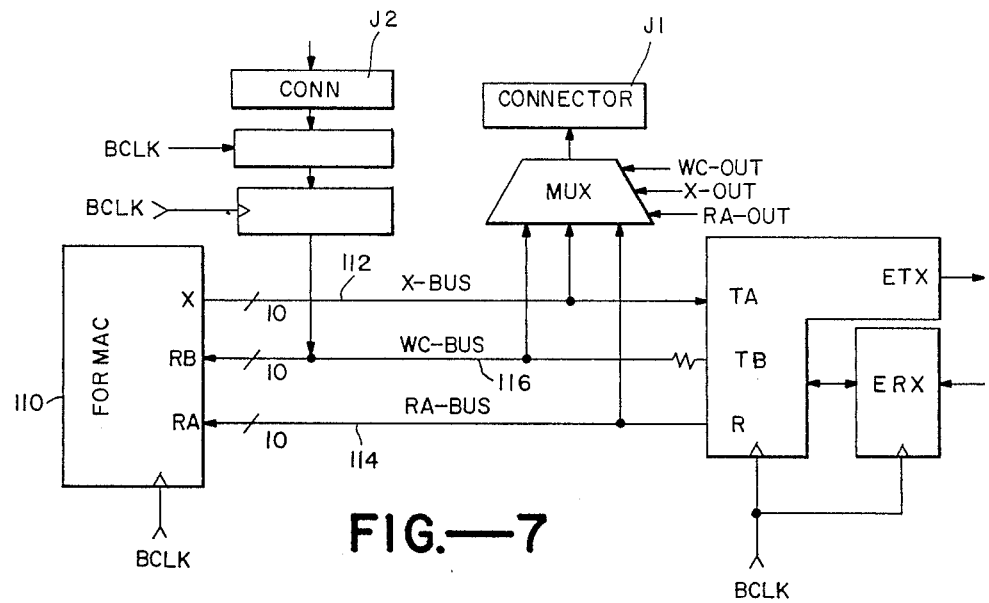
FIG.—7
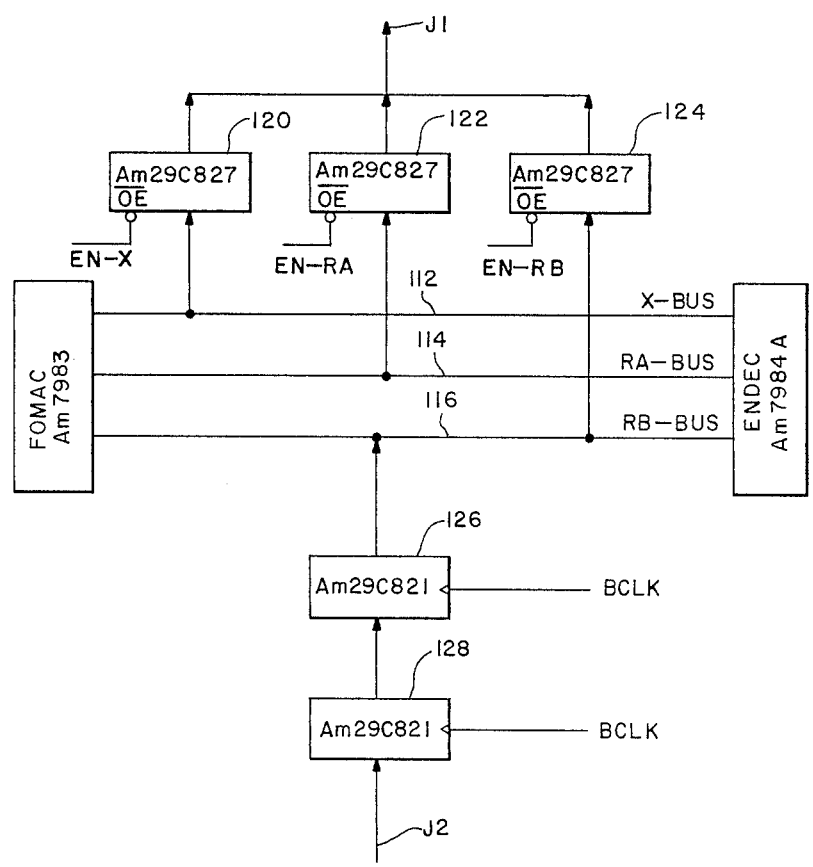
FIG.—8

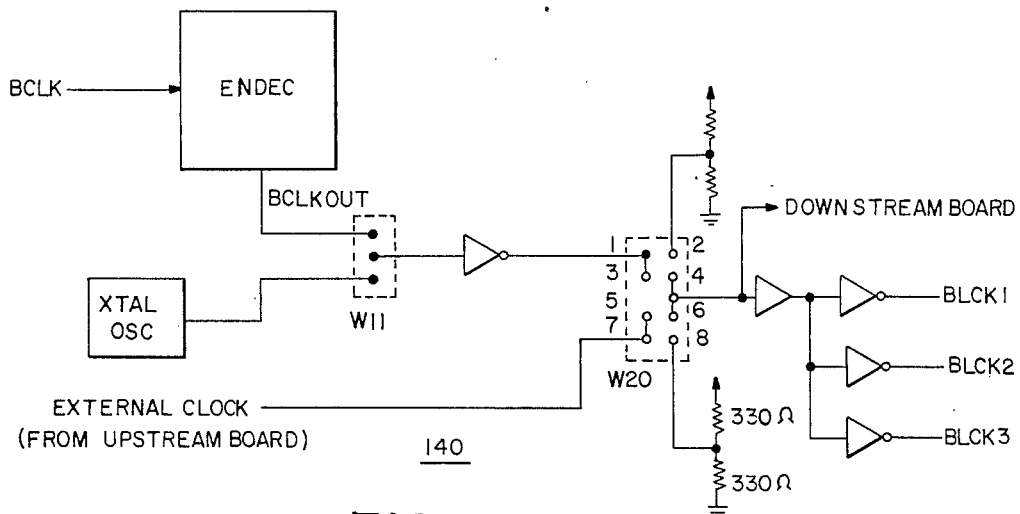
FIG.—10
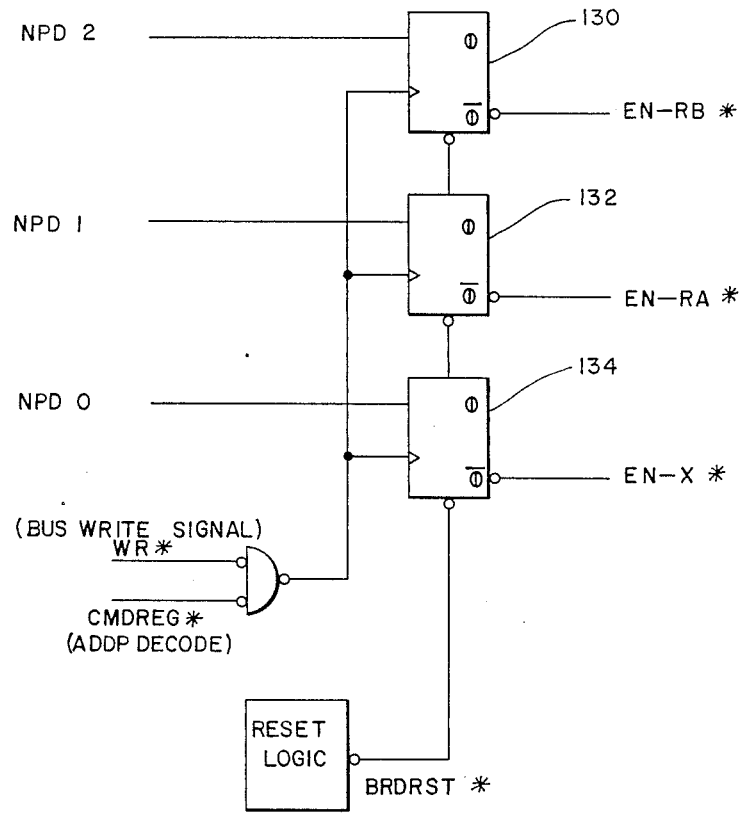
FIG.—9

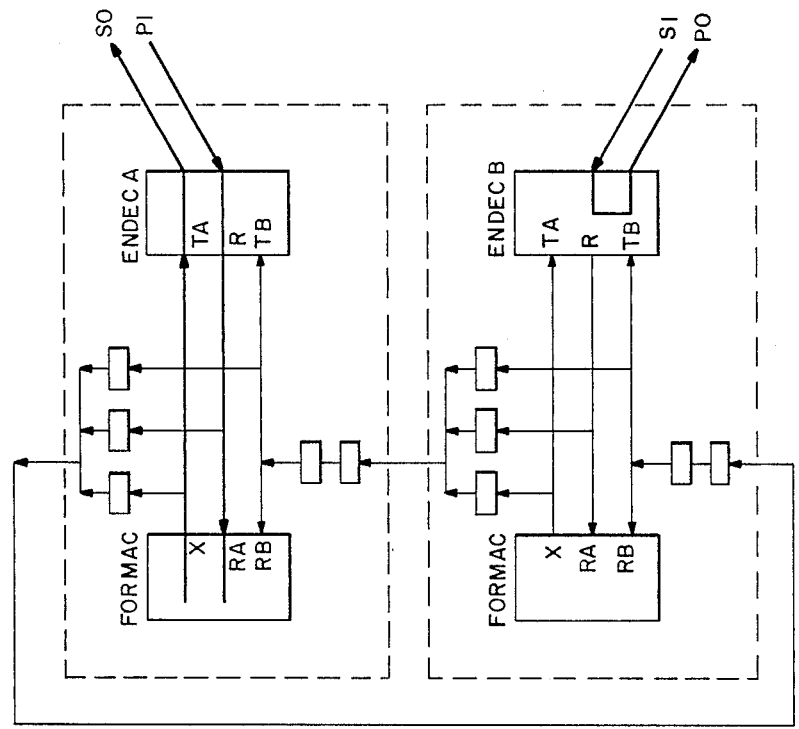
FIG.—11B  DAS SINGLE MAC "WRAP A"
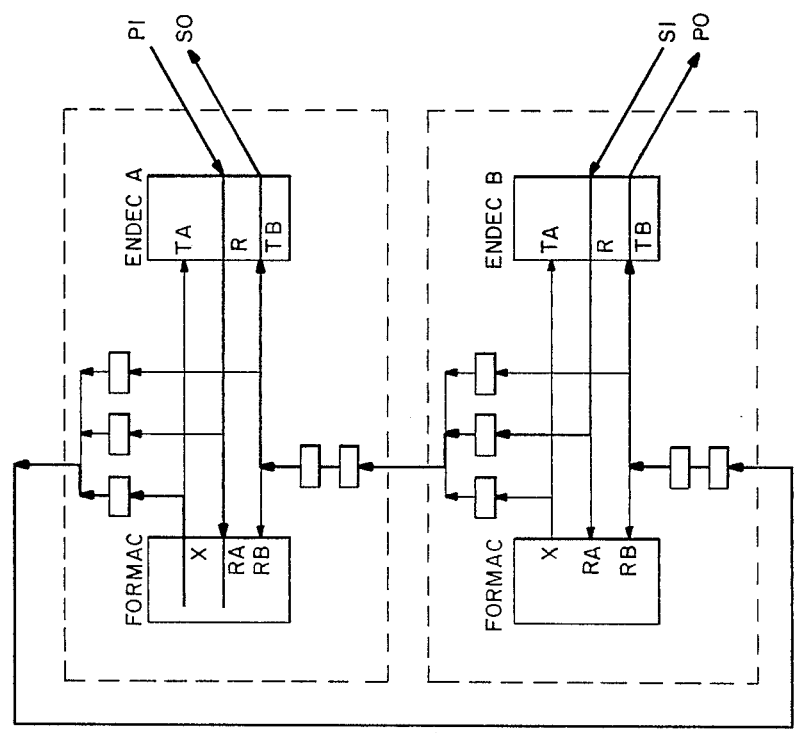
FIG.—11A  DAS SINGLE MAC "THRU"

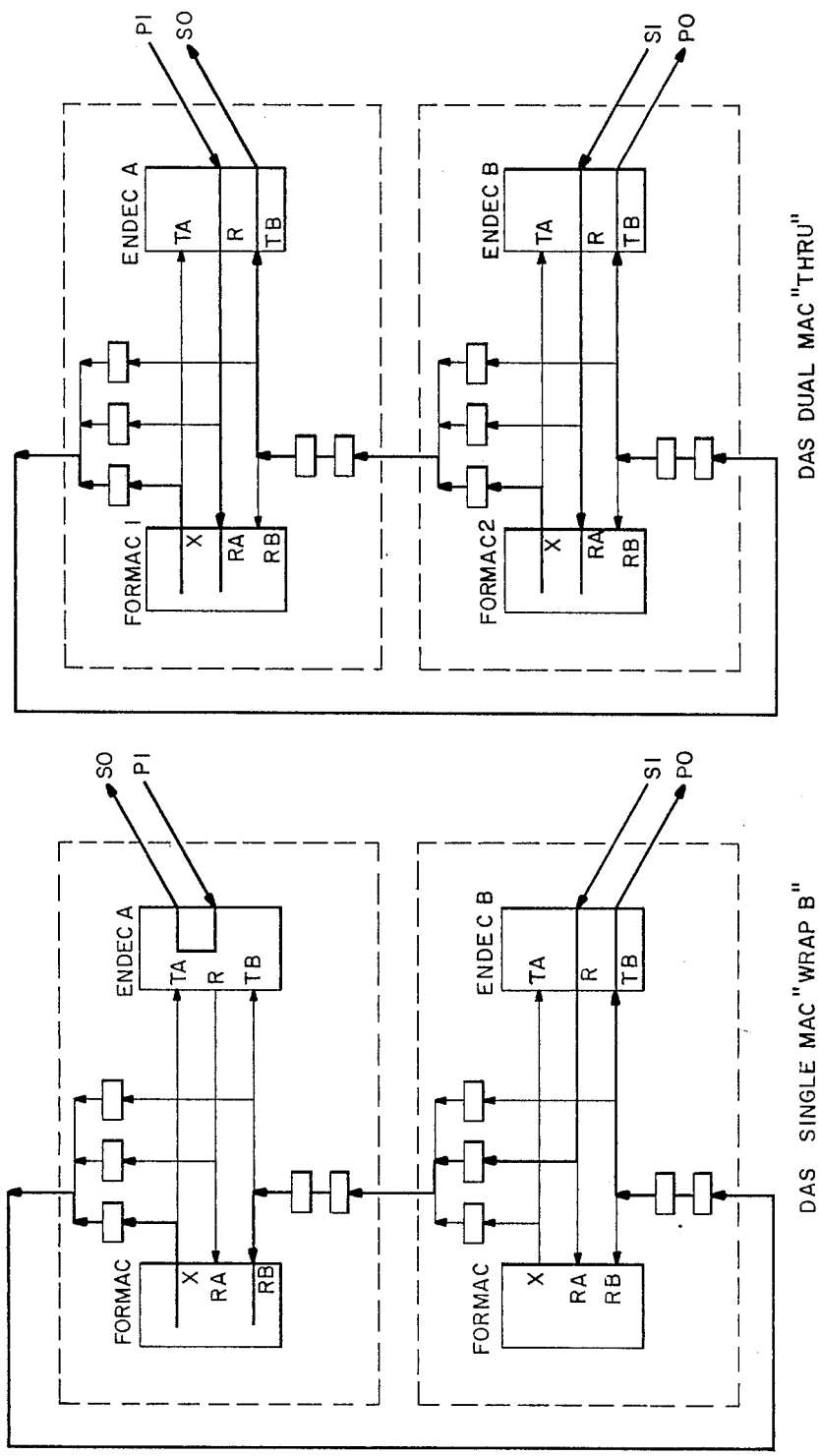
FIG.—12A
FIG.—11C

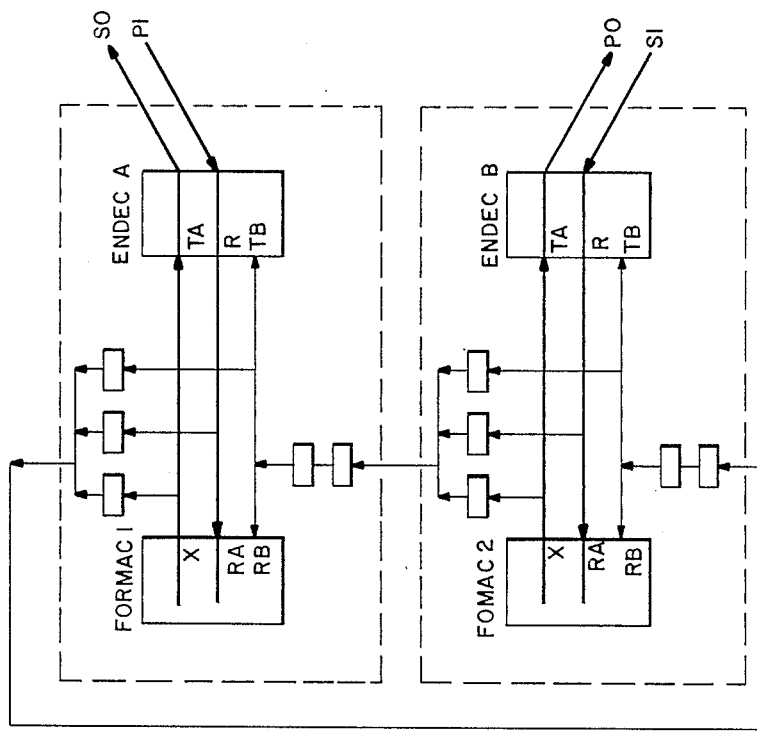
FIG.—12C DAS DUAL MAC "WRAP"
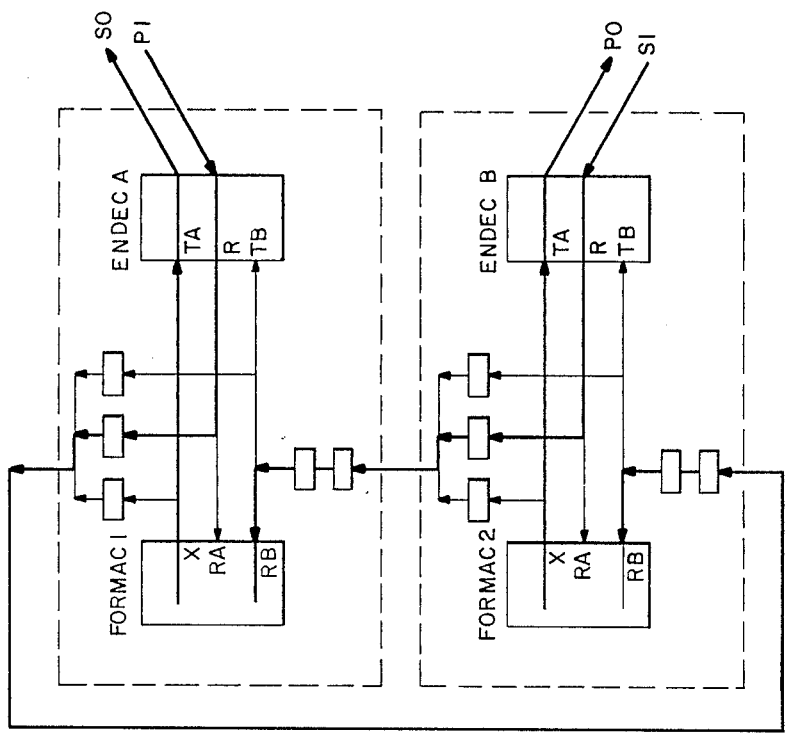
FIG.—12B DAS DUAL MAC "ALT THRU"

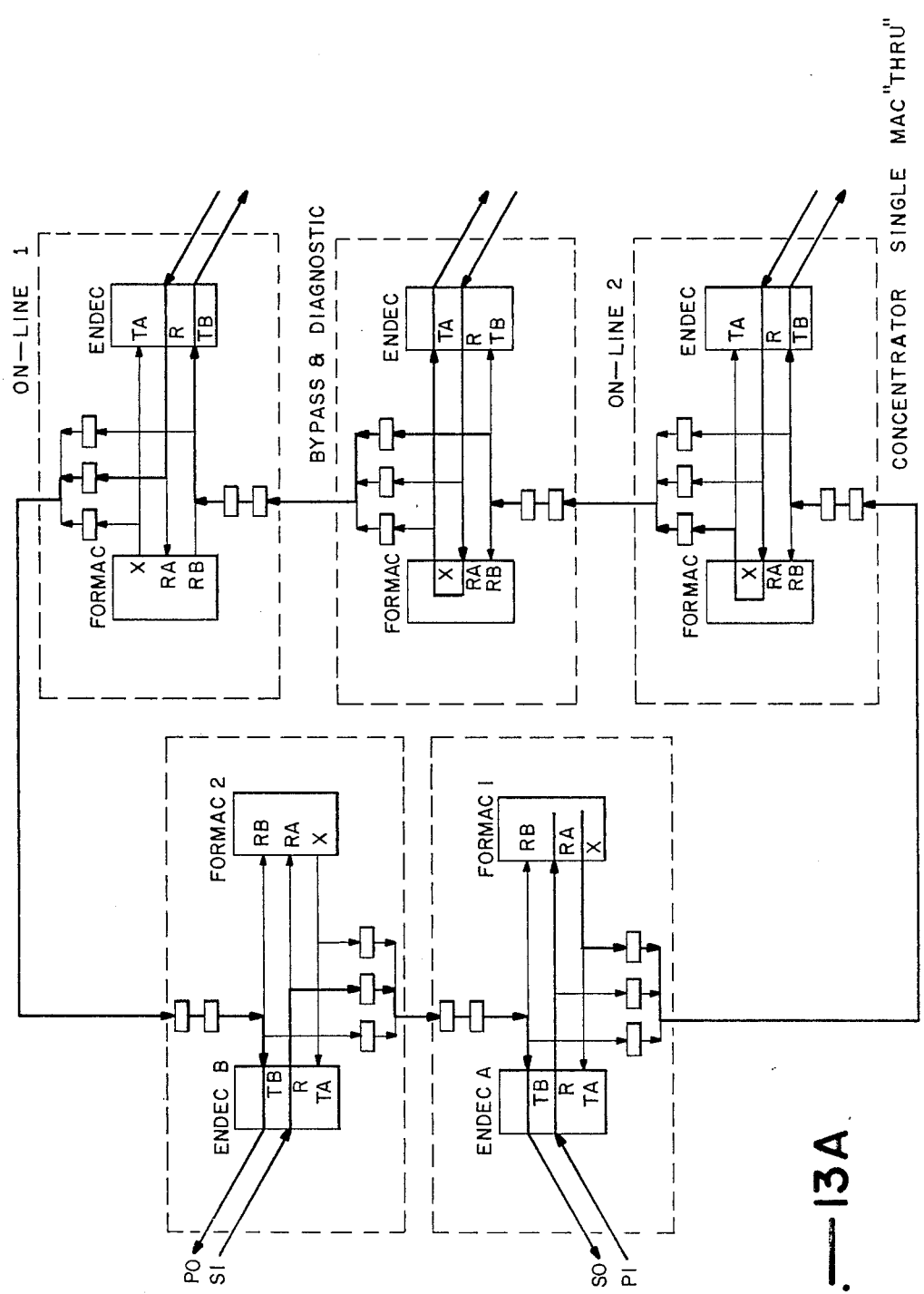
FIG.—13A.

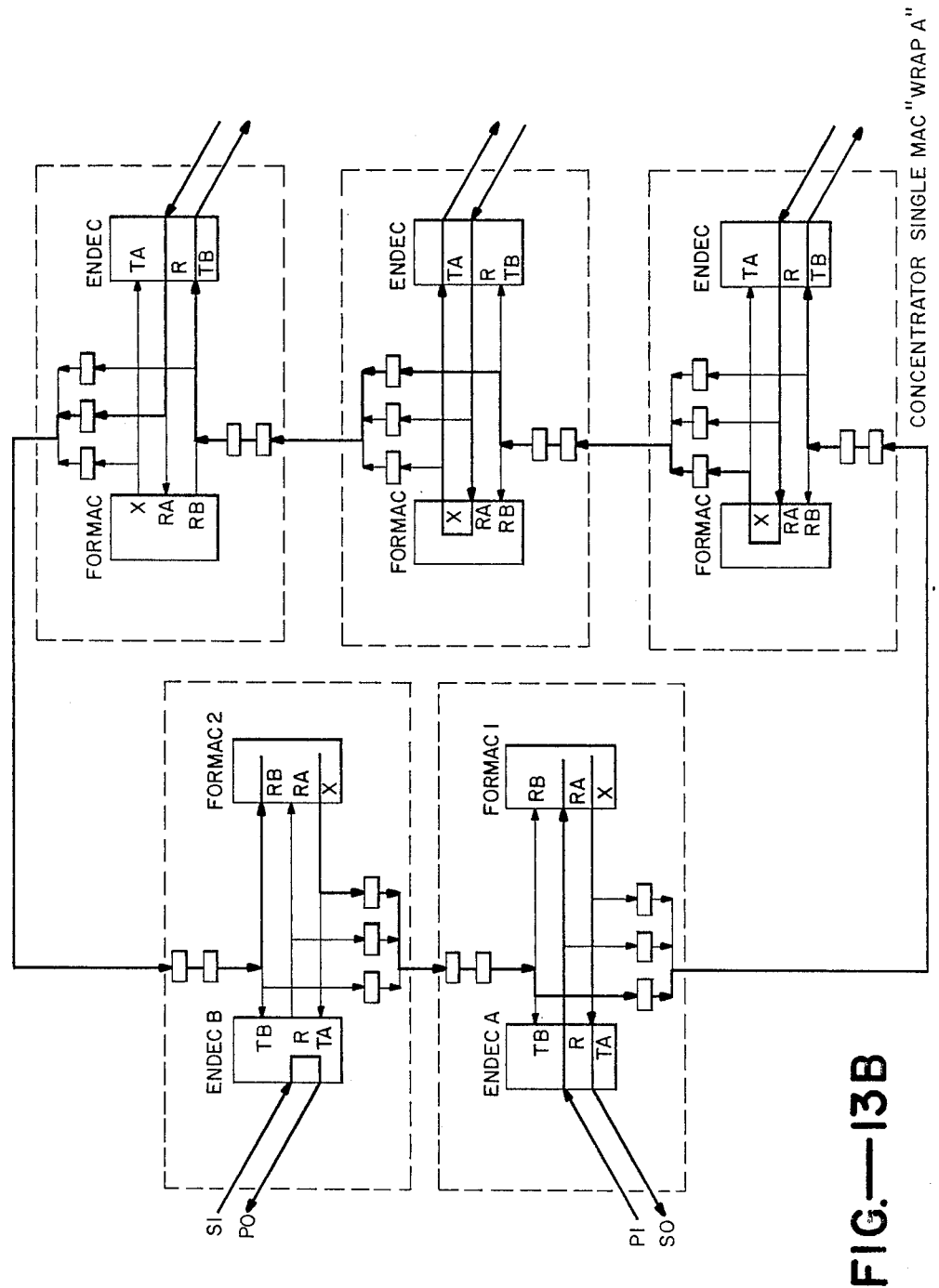
FIG.—13B

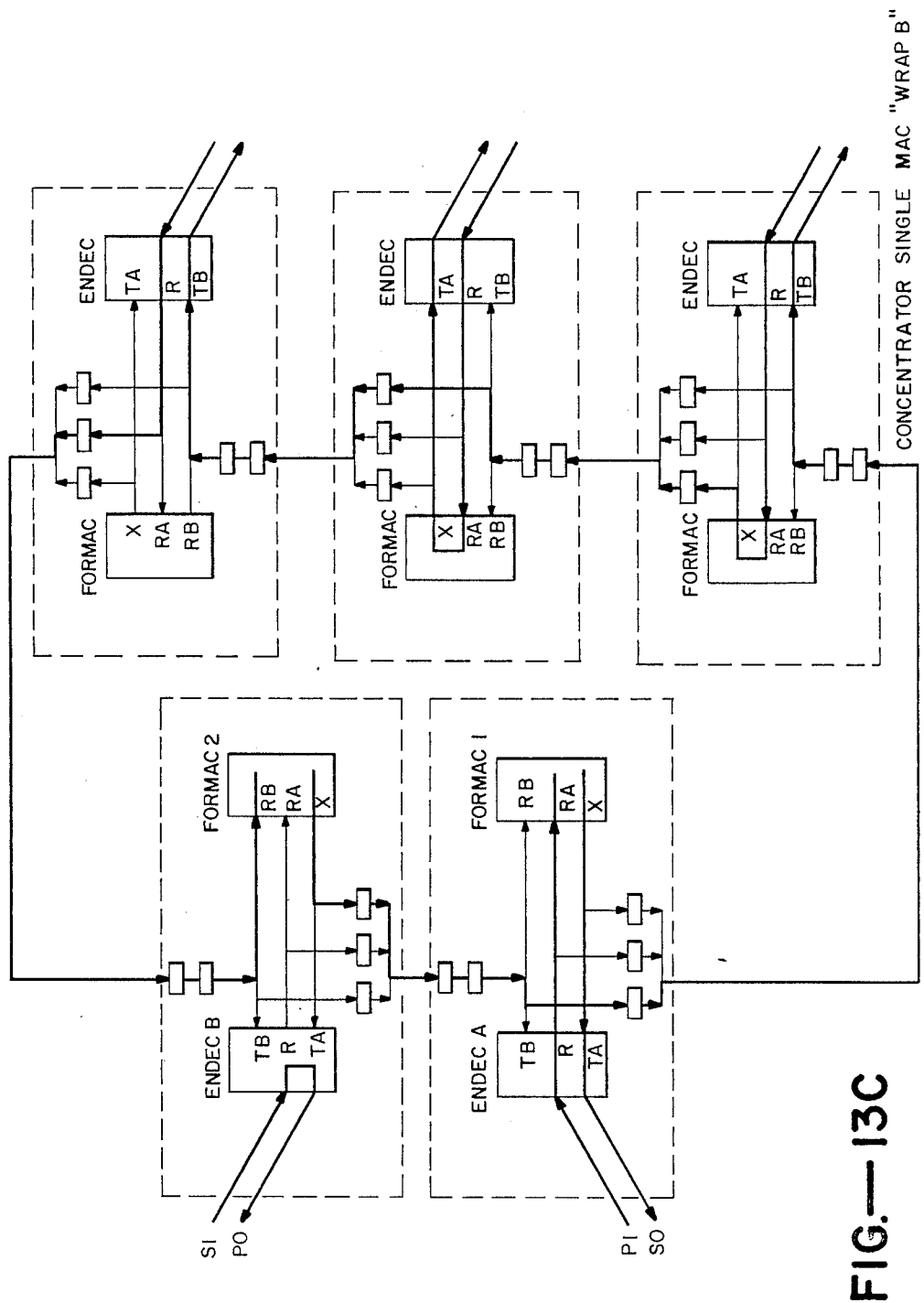
FIG.—13C

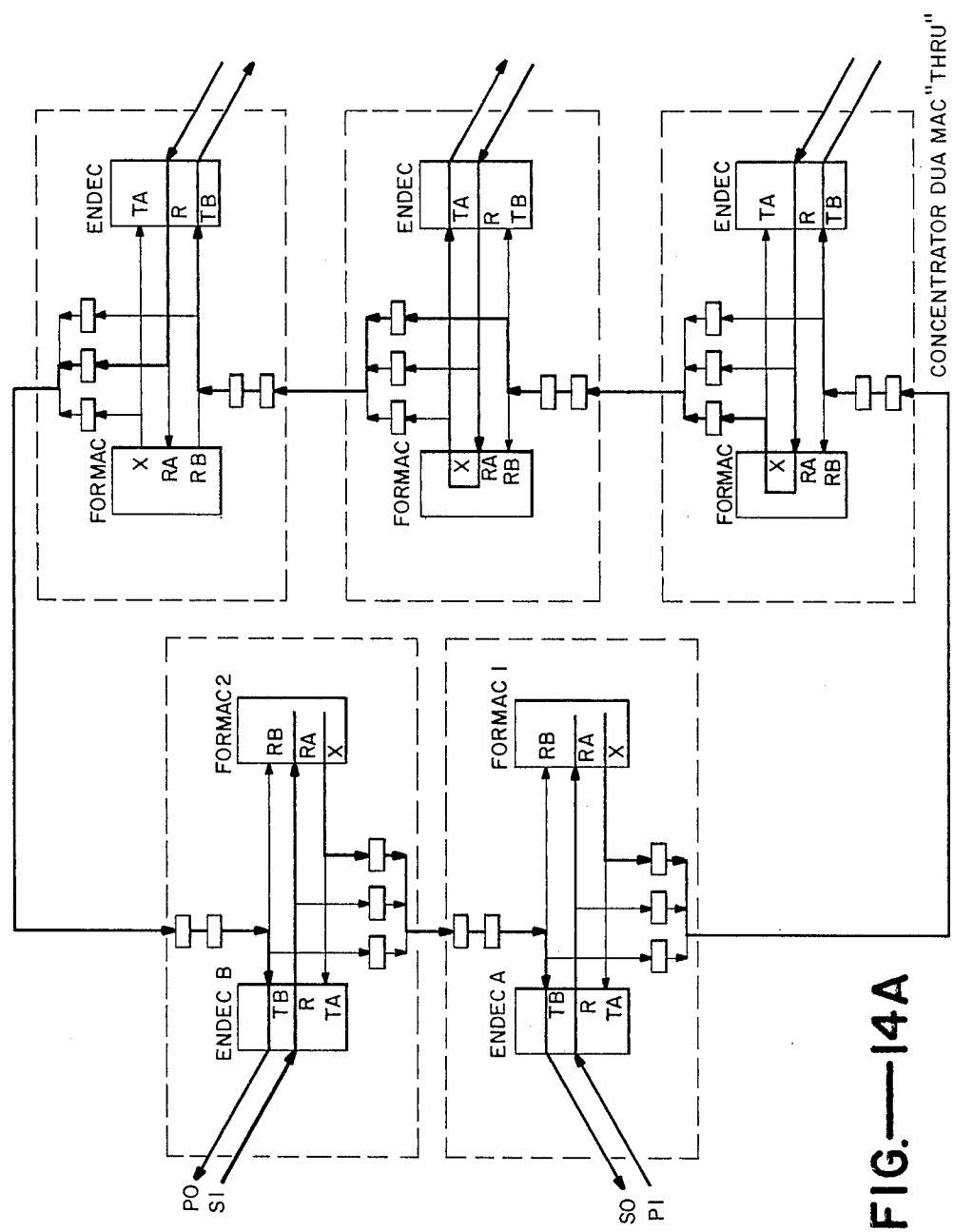
FIG.—14A

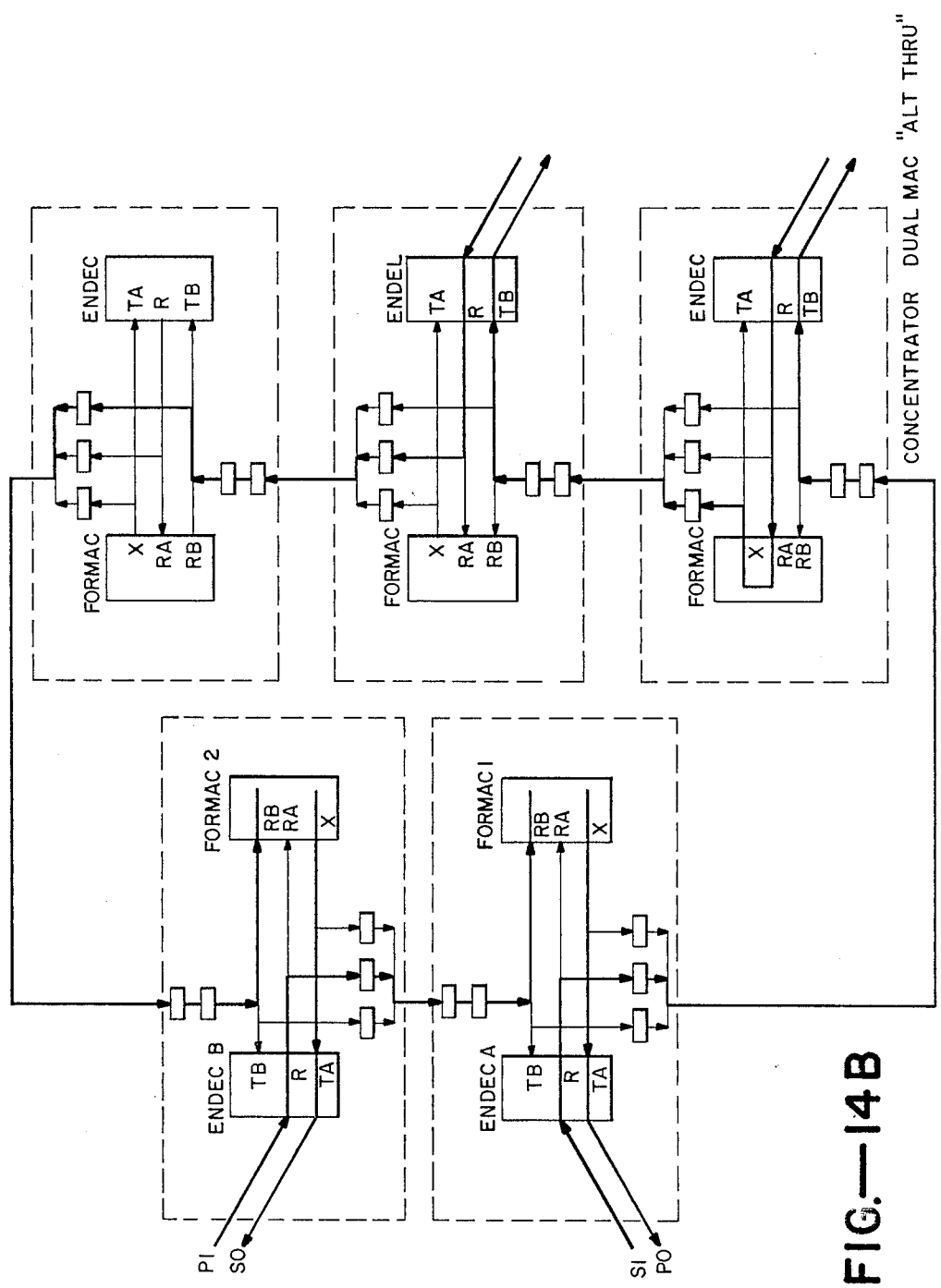
FIG.—14B

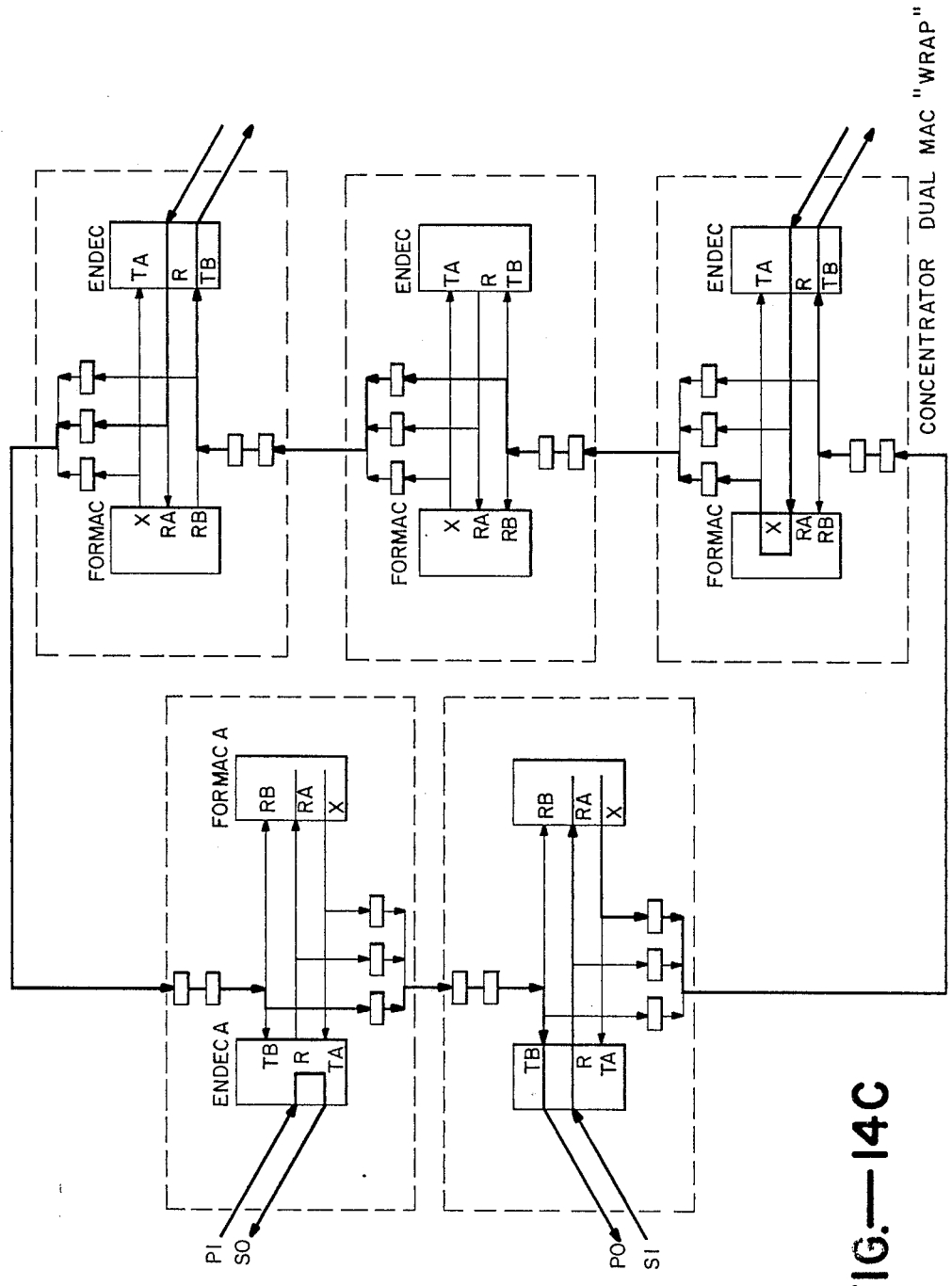
FIG.—14C

METHOD AND APPARATUS FOR CONFIGURING DATA PATHS WITHIN A SUPERNET STATION

BACKGROUND OF THE INVENTION

1. Field of the Invention.

This invention relates to high-speed network systems and, more particularly, to methods and apparatus for configuring and reconfiguring the operational mode of a station for such a network.

2. Prior Art.

Local area networks (LANS) are increasingly being used in office and factory applications. While several LAN protocols are currently available, applications in parallel processing, industrial control, inter-networking, and real-time voice and video systems require data rates that exceed those currently available.

The X3T9 Committee of the American National Standards Institute (ANSI) has defined a Fiber Distributed Data Interface (FDDI) network standard to provide increased network bandwidth. The Fiber Distributed Data Interface (FDDI) network uses two rings of optical fibers to interconnect up to 500 stations, or nodes to the network. The data counter-rotates on the rings and uses a timed token passing access protocol. The dual ring approach is used to minimize problems due to cable faults and station, or node, failures. The fiber optic rings themselves each consist of a series of point-to-point connections between neighboring nodes, where each node must repeat data for the network to be operating successfully. A primary ring is used for data transmission. A secondary ring (sometimes called the redundant ring) is also used for data transmission but also functions as a backup ring in the event of cable link or station failure. Each of the rings has a bandwidth of 100 Mbits per second.

The FDDI standard specifies four distinct protocol layers:

The Media Access Control (MAC) Layer selectively allocates the right to transmit data in the network among the various stations in a network. The MAC Layer defines a special timed-token protocol which guarantees efficient transmission of data by ensuring that a particular station can transmit a minimum amount of information on the ring within a predictable amount of time.

The Physical Protocol (PHY) Layer defines a groupencoding algorithm called 4B/5B and an elasticity buffer to maintain data synchronization between the network and a station.

The Physical Media Dependent (PMD) Layer defines the optical cable, transmitters, receivers and connectors used for implementation of the standard.

The Station Management (SMT) Layer defines bandwidth allocation and fault isolation methods; coordinates activity of the PMD, PHY, and MAC layers within a station; and manages neighboring physical links in the network.

The FDDI standard calls for two counter-rotating rings with the secondary ring serving as a backup in case of a line fault in the primary ring. The physical connection layer PMD provides two pairs of connections to the network fiber optic cables: Primary-In/Primary-Out and Secondary-In/Secondary-Out. To implement a dual-ring configuration, interface equipment includes a receiver for receiving input signals PI from the primary optical ring cable and a transmitter for sending output signals PO to the primary optical ring cable as well as a receiver for receiving input signals SI from the secondary optical ring cable and a transmitter for sending output signals SO to the second optical ring cable.

The FDDI standard specifies two types of stations, or nodes: dual attach and single attach stations. Dual access stations (DAS) attach directly to both the primary and to the secondary rings of the FDDI network and take advantage of the extra 100 Mbits per second bandwidth of the secondary ring by using a dual MAC architecture, or system configuration.

On the other hand, single attach stations (SAS) connect only to a single ring by means of a concentrator. A concentrator is a special dual attach station that not only attaches to the dual ring but which also has multiple ports to facilitate a physical star network topology.

Redundancy of information paths is a very important consideration in designing an FDDI station to handle various cable and equipment fault conditions. All dual attach stations repeat information on both rings. Consequently, certain stations that offer key services to a network, such as file servers, are preferably dual attach stations to take advantage of their redundant transmission ability.

Mobility, on the other hand, is an important consideration for connection of computer workstations or personal computers that change location. Single attach stations are useful in an environment, such as an office, where mobility is an important system design consideration. Concentrators for connection of single attach stations to the network serve to shield the network when a nomadic station is disconnected and also verify that each single attach station is operating properly upon reconnection of a station.

A single attach FDDI station has a single MAC combined with a single PHY/PMD pair. A dual attach station includes a minimum of one MAC and two PHY/PMD pairs. By using a dual MAC a dual attach station can take advantage of the extra bandwidth provided by the secondary ring.

A variety of local area network topologies are obtained with the two different types of FDDI stations. For example, to support a tree topology, a single attach wiring concentrator provides second-tier connections to a network. Additional tiers, or levels, are introduced by connection of another concentrator to the second-tier connection, and so on.

The FDDI standard specifies that a dual attach station operates in various modes to accommodate the network to reconfigure itself in response to a fault condition in one of the optical cables or in one of the stations on the network.

An obvious fault occurs when the electrical power is removed from an FDDI station, or node. In that case, an FDDI node is equipped with optical by-pass relays which channel primary-ring optical signals from the primary optical input terminals directly to the primary-ring optical output terminals. Similar optical by-pass relays are used for the secondary optical ring. The FDDI standard permits for up to three consecutive stations to be optically bypassed.

A desirable feature of an FDDI station would be the ability to reconfigure the station to accommodate various cable link and node fault conditions.

SUMMARY OF THE INVENTION

It is an object of the invention to provide apparatus for easily configuring a dual-ring local and network station, or node, to a configuration to accommodate a ring fault or a node fault.

It is another object of the invention to provide modules which may be coveniently selected and grouped to provide a flexible architecture for configuring and reconfiguring local area network stations.

It is another object of the invention to provide a local area network station which is implemented on plug-in cards for a personal computer.

In accordance with these and other objects of the invention, apparatus is provided for reconfiguring the various data paths within a dual-ring local area network. It is understood that a network station includes a number of different circuits, such as certain circuits provided, for example, by Advanced Micro Devices, Inc. in its trademarked SUPERNET family, or chip-set, of FDDI network integrated circuits described hereinbelow. The Am79C83 FORMAC implements the FDDI media access controller MAC function. The Am7984 transmitter and the Am7985 receiver collectively provide an ENDEC to implement the FDDI PHY functions. To implement a dual-ring FDDI local area network station as printed circuit modules which are plugged into, for example, a personal computer such as a PC/AT or the like, various other elements such as optical data link components, AT bus interface circuits, Buffer memory interface circuits, CMT logic circuits, and FDDI configuration interface circuits are required. The present invention interfaces and utilizes these components to provide a reconfigurable network station. The invention, in general, is not limited to printed circuit boards or to any specific type of modules. The invention is particulary applicable to implementation of a station for a local area network in a personal computer using plug-in circuit modules or cards, such as, for example, the FAST card produced by Advanced Micro Devices, Inc.

A dual access station has access to both the primary ring and the secondary ring of a dual-ring cable. For a dual access station for a dual-ring network, a first module and a second module, each including a MAC, ENDEC, and interconnecting bus are provided. The ENDECs are connected, respectively, to one conductor of the primary ring and to one conductor of the secondary ring. Each modules also has a multiplexer for selecting certain signals form a respective interconnecting bus. Latches are also provided for feeding signals into the bus, particularly into the RB/TB bus which is a receive bus for the second MAC and a transmit bus for the second ENDEC. Means are also provided for controlling the multiplexers and the data paths through respective MACs and ENDECs to selectively configure the network station in a certain operational mode. Control of the configuration, that is, selection of data paths, is provided, for example, from a host computer or the node processor on the circuit card. Clock signal selection logic is also provided for selecting between a local clock or an external reference clock which is provided, for example, from one of the modules. In addition, a station, with the addition of another module to serve as a Class B single attach station, functions as a concentrator.

In a particular aspect of the invention, the network station components for a dual-ring local area network station are partitioned into two circuit modules such as circuits cards for a personal computer. The cards are connected by jumper cables.

According to another aspect of the invention, a module, or building block, for various station configurations is provided. The module includes a MAC and an ENDEC connected by a bus. Certain signal on the bus are selected by control of a multiplexer. Input to the bus is through a latch circuit. A second module is combined with the first module, as described above, to form a dual-ring network station.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1 is a block diagram of an FDDI station implemented by interconnection of an Advanced Micro Devices, Inc. Supernet integrated circuit chip set.

FIG. 2 is a block diagram of an integrated circuit which implements the MAC layer protocol for the FDDI standard.

FIG. 3 is a block diagrams of transmitter and receiver integrated circuits which implement the physical electrical interface for an FDDI network.

FIG. 4 is a diagram representing an FDDI network having stations operated as single attach, dual attach, or concentrator stations.

FIG. 5 is a diagram representing the FDDI network of FIG. 4 reconfigured due to a cable fault and showing stations in the wrap mode and in the through mode.

FIG. 6 is a detailed block diagram of one of two similar station printed circuit cards showing the multiplexer and latches according to the invention for interconnecting signal between the cards.

FIG. 7 is a block diagram showing only certain elements of an FDDI station card having an output multiplexer and input latches adapted for reconfiguration of the station according to the invention.

FIG. 8 is a block diagram showing a specific implementation of the output multiplexer and input latches of FIG. 7.

FIG. 9 is a block diagram showing a specific implementation of the multiplex control logic circuits.

FIG. 10 is a block diagram of a clock selection and distribution system for an FDDI station card according to the invention.

FIGS. 11A, 11B, and 11C show a dual attach station configuration using a single MAC to provide, respectively, THROUGH, WRAP A, and WRAP B modes of operation for a station.

FIGS. 12A, 12B, and 12C show a dual attach station configuration using two MACs to provide, respectively, THROUGH, an alternate THROUGH, and WRAP modes of operation for a station.

FIGS. 13A, 13B, and 13C show a concentrator station configuration using a single MAC to provide, respectively, THROUGH, WRAP A, and WRAP B modes of operation for a station.

FIGS. 14A, 14B, and 14C show a concentrator station configuration using two MACs to provide, respectively, THROUGH, an alternate THROUGH, AND WRAP modes of operation for a station.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Referring now to FIG. 1 of the drawings, a block diagram of a standard FDDI station is implemented by interconnection of the component integrated circuit provided by Advanced Micro Devices, Inc. of Sunnyvale, California, as the Supernet family of integrated circuits for the FDDI standard. ANSI X3T9.5 specification, also named the Fiber Distributed Data Interface (FDDI), defines a means of interconnecting equipment with a very high-speed network. Running at a data rate of 100 Mbps over fiber optic cable, the proposed standard offers ten times the speed of Ethernet, excellent noise immunity, and a timed-token passing protocol which guarantees each node access to the network. The 5-chip SUPERNET family meets the standard and offers a variety of additional systems features. The SUPERNET architecture partitions the buffer management functions common to most network protocols into two chips, the Am79C81 RAM Buffer Controller (RBC) 12 and the Am79C82 Data Path Controller (DPC) 14. The RBC 12 provides DMA channels and arbitrates access to the network buffer memory 16; the DPC 14 controls the data path between the buffer memory 16 and the medium. Functions specific to the FDDI link layer are packaged into the Am79C83 Fiber Optic Ring Media Access Controller FORMAC 18. Physical layer tasks defined by the ANSI standard are performed by a twochip Encoder/Decoder function 20 (the Am7984 ENDEC Transmitter, or ETX 22, and the Am7985 ENDEC Receiver 24, or ERX) and an Optical Data Link (ODL). The Node Processor (NP) 26 shown in the diagram is not a chip but rather a sophisticated controller for overseeing the SUPERNET. The buffer memory is used for temporary storage of data as it passes through the interface between the host 28 computer and the medium 30. The primary function of the SUPERNET chip-set is to act as an interface between a host computer and the network medium, transferring data and converting it between parallel form (at the host) and serial form (at the media).

System Data Paths

The node receives data in serial form from the network medium 30. The Optical Data Link 32, 34 interfaces to the medium and the ERX derives clocking information from the encoded stream, passing it on to the FORMAC. The FORMAC sends 8-bit parallel data on the Y-bus 36 to the DPC 14. The DPC converts this to a 32-bit parallel bus called the D-bus 38 and the RBC 12 sets up addresses on the 16-bit ADDR-bus to store the packet in buffer memory.

This data is finally sent to the host processor on a 32-bit D-bus 38. The host processor is assumed to be 32 bits wide; if this is not the case, then some interface logic is used to match the bus widths. The Node Processor (NP), which may be a 16- or 32-bit wide system interfaces to the RBC, DPC, FORMAC, and ETX via a 16-bit bus called the NP-bus. The NP typically uses this bus for initialization and control. In addition, the NP can also be connected directly to memory through the 32-bit D-bus if so desired.

There are control and handshake lines provided on the RBC, the DPC, and the FORMAC to determine the direction of data flow on all the buses.

SYSTEM COMPONENTS

Host System. The term "host" is used here to refer to any mainframe, workstation, minicomputer, or computer peripheral (such as a disk drive or a printer) to which a network interface is attached. In a large system, a powerful NP may be used to off-load various networkingspecific chores. In simpler systems, the host and the NP may be one and the same, meaning that the host computer performs all the NP functions. Lower-cost systems will typically use this configuration.

Node Processor. The Node Processor (NP) can be a microprogrammed or conventional microprocessor-based system used for overseeing the operation of the SUPERNET chip-set. Its main function is to initialize these chips and respond to various system-level and packet-level interrupts. In the simplest case it can be a minimal state machine. More complex architectures can have all the sophistication required to execute the upper-layer protocols specified by the seven-layer international Standards Organization (ISO) model.

The NP communicates with the SUPERNET chip-set using the NP-bus and various bus handshake and instruction lines. Its handshake with the Host system is user-defined and depends on the partitioning of functions between the Host and the Node Processor.

The NP can communicate with the buffer memory by issuing an NP request to the RBC and using the DPC-controlled 32-bit D-bus, or through software instructions to the RBC and accessing data in buffer memory through the DPC's internal registers. A typical NP could consist of a microprocessor with assorted peripheral chips (for DMA, interrupts, etc.) and local memory. The NP treats the SUPERNET chip-set as a peripheral for networking functions. The NP has complete control over (and knowledge of) the state of the SUPERNET chip-set and buffer memory. These chips make their status available to the NP to help it maintain this control.

The NP can run either synchronously or asynchronously with respect to the network clock. Any required synchronization with ICs surrounding the SUPERNET chip-set is performed by the RBC at the RBC-NP interface.

Buffer Memory. The buffer memory 16, consisting of static RAM, is used for intermediate storage of frames. Its addresses are generated by the RBC 12. In a typical case, the RBC and DPC store a received frame in the memory. The NP does any processing necessary to assure the host that the frame is good. Finally, the frame is transferred to the host. Frame transmission is just the reverse. At a 100-Mbps data rate, a 55-ns access time is generally adequate. Both separate I/O and multiplexed I/O configurations can be used. As an option, the memory can be set up to have byte parity.

The memory can be accessed by the DPC, the NP, and the host. Only one of these can access the memory at any time, and the RBC arbitrates all requests to determine who can access the memory.

Am79C81 RAM Buffer Controller (RBC). The RBC 12 generates addresses to buffer memory 16 for received and transmitted frames. The received frames are taken from the FORMAC 18, converted from 8-bit to 32-bit form by the DPC 14, and stored in the buffer memory 16. The frames to be transmitted are taken from the buffer memory and sent to the FORMAC. The RBC has three DMA channels and arbitrates DMA requests coming from the DPC, the NP, and the host. The RBC also handles buffer management. It makes the buffer RAM appear like a wrap-around FIFO for storing received frames by manipulating its various internal pointers, and uses a linked-list structure for transmitting frames.

The RBC interfaces with the DPC, using handshake signals, to generate buffer memory addresses for transmitted or received frames. It interfaces with the NP using instruction and bus interface lines. It also has a DMA request channel which permits the NP to use the buffer memory. The RBC also provides interrupts to the NP. The RBC's only interface with the host is through DMA request channels which allow the host use of the buffer memory. Its interface with the memory is direct through the address and control lines.

Am79C82 Data Controller (DPC). The primary function of the DPC 14 is to convert data in received frames from byte-wide to 32-bit word formats and to convert data in transmitted frames from 32-bit to byte-wide formats. When receiving a data frame, the FORMAC 18 sends 8-bit parallel data onto the Y-bus. These 8-bit bytes of data are reconfigured by the DPC into 32-bit parallel form on the D-bus and stored in the buffer memory. Frame transmission is just the reverse of this process. The DPC also performs parity checks and generates frame and node status. It interfaces with the NP using instruction and bus interface lines, and provides interrupts to the NP. The DPC interfaces with the RBC using handshake signals which request the RBC to generate addresses in the buffer memory for transmitted or received frames. The DPC's interface with the RBC also allows it to check parity for the host or the NP DMA reads or writes to buffer memory. The DPC interfaces with the FORMAC using handshake signals which allow it to start transmitting or receiving frames. Its interface with the memory is direct through the data bus.

Am79C83 Fiber Optic Rino Media Access Control (FORMAC). The FORMAC performs Media Access Control (MAC) layer protocol for the FDDI standard networking scheme. The FORMAC determines when a node can get access to the network and implements the logic required for token handling, address recognitions, and CRC.

Upon receiving a frame, the FORMAC 18 strips away all the physical layer headers before sending the frame to the DPC. Any preamble or start of package delimiters are detected and discarded by the FORMAC. In the same way, any end-of-frame characters or postamble is also removed. The FORMAC checks incoming frames for destination address and notifies the DPC when a match does not occur. It also generates and checks CRC on packets.

The FORMAC 18 generates status bits which identify node conditions and frame status. Frame Status is written in the buffer memory by the DPC. The DPC recognizes status through a special handshake. Node Status and operational information are stored in an internal status register that is accessed through the NP-bus.

The interface between the DPC and FORMAC is an 8-bit data path. The DPC is a half-duplex device, meaning that it can either transmit or receive on its 8-bit bus. The FORMAC provides optional full-duplex capability. This feature is not required by the FDDI specification; if this feature is not desired, then the FORMAC YR and YT buses can be tied to the Y-bus of the DPC to implement a half-duplex system.

The FORMAC's interface with the ETX and ERX consists of three 11-bit (eight data, two control, and one parity bit) buses. Two of these handle received data frames, while the third is used for data transmission. Data on these buses moves synchronously with the byte rate clock (BCLK).

Am7984 ENDEC Transmitter (ETX). The FORMAC transmits data frames in the form of 8-bit bytes accompanied by two control characters and one parity bit. The ETX 22 then performs 4B/5B encoding which maintains DC balance in the output waveform and guarantees that no more than three consecutive 0's will be present in an encoded pattern. The ETX then converts the data from parallel to serial format and sends an NRZI (non-return to zero, invert on ones) bit stream to the fiber optic transmitter. The ETX also communicates with the NP to force FDDI-specified line states onto the medium, perform various loopback functions, and select which transmit or receive bus will be active. The byte clock, used by the rest of the network interface, is also generated by the ETX.

Am7985 ENDEC Receiver (ERX). The ERX extracts the receive bit clock from the serial frames which are received from the network medium. This timing information is used to perform NRZI-to-NRZ decoding, convert the bit stream to 5-bit parallel form, perform 4B/5B decoding, and then send the data to the receive MUX in the ETX for further transmission to the FORMAC. An elasticity buffer on the ERX allows nodes to operate at slightly different clock rates ($\pm 0.005\%$ as specified by the FDDI standard).

Optical Data Link (ODL). Fiber optic receivers 32, 42 typically consist of a PIN diode, amplifier, equalizer, automatic gain control circuit, and comparator. The PIN diode receives an optical signal from the fiber and converts it into an electrical waveform. The signal is then amplified and conditioned. Amplifier gain is variable and depends on the magnitude of the incoming signal. The conditioned waveform is then passed through a comparator which determines whether the output should be a logic "1" or "0". The resulting bit stream is then fed to the ERX with a pair of differential drivers.

A fiber optic transmitter 34, 44 accepts a differential signal from the ETX and, by means of a light-emitting diode (LED), converts it into an optical output for transmission onto the fiber optic cable.

FIG. 2 shows a block diagram of an Advanced Micro Devices, Inc. Am79C83 Fiber Optic Media Access Controller (FORMAC) integrated circuit, or chip 50. This chip is a CMOS device which implements timed token passing protocol as specified by the FDDI standard. It performs data frame formation functions such as generating preamble, CRC, and status information. Information needed by the station-management software for ring diagnostics and statistical network characterization is also provided by this integrated circuit. Seven buses provide for interface of the FORMAC with external circuits. The NP-bus 52 provides a path for initialization and control of the chip. The RA-bus, the RB-bus, and the X-bus provide the FORMAC with an interface with the physical layer. Data signals received from the fiber optic media are selected to be inputted to the chip via a multiplexer which selects one of the R-buses. Data signals are sent to the fiber optic media on the X-bus. Data frames received on the selected R-bus are repeated on the X-bus. Data frames are not repeated when the FORMAC is in a transmit-data, issue token, claim, or beacon states.

FIG. 3 shows an ENDEC 60 transmitter 62 and receiver 64 which provide the physical electrical interface for an FDDI network. The transmitter provides code conversion and interfaces for connection management. The receiver handles clock recovery, byte alignment, decoding, and clock mismatch buffering.

The FDDI standard calls out three types of network nodes, or stations: a single attach station (SAS); a dual attach station (DAS), and a concentrator station. A single attach station connects to only one of the rings. A single attach station uses one MAC and one ENDEC. A dual attach station connects to both the primary ring and to the secondary ring. A dual attach station uses one or more MACs and two ENDECs. A dual attach station is operated in either of two modes, a through mode and a wrap mode.

In the through mode, input signals to the station from the primary ring are coupled through the station and then out to the primary ring.

In the wrap mode, input signals to the station from the primary ring are coupled through the station and then out to the secondary ring.

For a dual attach station with one MAC, the wrap mode is implemented either as a WRAP A or as a WRAP B configuration. In the WRAP A configuration, the input signal from the primary ring to the station is channelled through a data path in the MAC and then out to the secondary ring. Because only one MAC is used, in the WRAP A configuration, the secondary ring input signal to the station is channeled through a data path only within the ENDEC and then out to the primary ring. Alternatively, in the WRAP B configuration, the input signal from the secondary ring to the station is channelled through a data path in the MAC and then out to the primary ring. In the WRAP B configuration, the primary ring input signal to the station in channelled through a data path only within the ENDEC and then out to the secondary ring.

For a dual attach station with two MACs, only one wrap mode WRAP is implemented. The input signal to the station from the primary ring is passed through one of the MACs and out to the secondary ring. For the WRAP mode, the input signal to the station from the secondary ring is passed through the other MAC and then out to the primary ring.

FIG. 4 illustrates an FDDI network 70 composed of dual attach dual attach stations 72, 74, 76 and single attach single attach stations 78, 80, 82. The wiring concentrator 84 is actually a special case of a dual attach station. It has two connection to the primary ring and single connections to the single attach attachments. FIG. 4 shows a fully configured ring with no broken cables. The arrowheads indicate the direction of data flow on the counter-operating rings. The single attach stations are connected only to the primary ring via the concentrator. All stations attach to the ring with duplex fiber cable. The cable houses both optical fibers in a single jacket and the two fibers are terminated with a single duplex connector. Dual attach-to-single attach connects concentrator-to-single attach with the same type of connector.

FIG. 5 shows the FDDI network of FIG. 4 suffering from a cable fault between Station D 84 and Station G 76. The FDDI network system compensates for this break by channeling the data signals back through the secondary ring. When the faulty cable link is detected by the neighboring Stations G and D, it is isolated.

FIG. 6 shows the interconnections between the MAC and the ENDEC units, where the ENDEC functions as an FDDI PHY unit in a so-called FAST printed circuit board 100. The figure shows a detailed block diagram for a FAST, that is FDDI PC/AT SUPERNET technology, circuit board available from Advanced Micro Devices, Inc. as an FDDI system evaluation circuit board which plugs into an IBM PC/AT personal computer. One FAST printed circuit board in a PC/AT personal computer works as a Single Attachment Station (SAS). Using two or more boards, other FDDI station types such as DAS (Dual Attachment Station) or Concentrator (CONC) can be realized. To construct a DAS or a CONC, two or more MAC (media access controller) and two or more PHY (physical layer) are needed. Various connections between MAC and PHY units generate different types of FDDI stations. Hence the key in using multiple FAST cards for DAS and CONC, is in manipulating the three buses connecting PHY and MAC units. The reconfiguration multiplexers control the three buses. Reconfiguration is further facilitated by the MAC and PHY also having internal control over these buses.

The FAST card is available as an FDDI demonstration tool and provides all the features of an FDDI station card. Even though it is designed as a Single Attachment Station (SAS), hardware hooks, or interfaces, have been provided so that Dual Attachment Station (DAS) and Concentrator (CON) configurations of various types can be constructed using two or more boards. These hardware hooks are realized using three tri-state buffers (with outputs shorted together, they act as 10-bit, 3 to 1 multiplexers), two registers and two 26-pin connectors. Using about 4-inch long ribbon cables and the 26-pin connectors the adjacent FAST boards, which are also plugged into the same AT motherboard, can be connected together.

FIG. 7 shows the Reconfiguration Multiplexer scheme in more detail. The on-board FORMAC 110 transmit bus, X_bus 112 is connected to the TA_bus of the ENDEC. X_bus is output from FORMAC and TA_bus is input to the on-board ENDEC. The on_board FORMAC receive bus RA_bus 114 is connected to the on-board ENDEC R_bus. RA_bus accepts data transmitted by the ENDEC on the R_bus. The second receive bus 116 of the on-board FORMAC, the RB_bus, also called the WC_bus, is connected to the receive bus, the TB_bus, of the on-board ENDEC. The data coming from the adjacent card will be received on the RB/TB bus and either the FORMAC or the ENDEC ca accept that data.

FIG. 8 shows the three buses X/TA, RA/R and RB/TB are also connected to the inputs of a 10-bit, 3 to 1 multiplexer formed using three 10-bit tri-state buffers Am29C827 120, 122, 124. The buffer enables are under software control. The buffer outputs are connected together to construct a 3 to 1, 10-bit multiplexer. As shown in FIG. 7, the 10-bit multiplexer output is available at a 26-pin connector, J1, from where it can be supplied to another board over a 26-pin cable. Two registers Am29C821 126, 128 accept the data coming from another FAST card over J2, the second 26-pin connector. A 26-pin cable connects J1 of one board to J2 of the second board. Data always flows from a connector J1 to a connector J2.

FIG. 9 shows a series of D flip-flops 130, 132, 134 for controlling the multiplexer.

BCLK Synchronization Between Boards. FIG. 10 shows a clock selection and distribution arrangement 140. When multiple boards are used to construct DAS or CON type of FDDI station, only one board should sources BCLK and all the other boards should regenerate that clock locally so that all the boards forming one system run synchronous to each other. The BCLK on the first board is inverted. This inverted clock is sent to other boards over a ribbon cable and is made available for internal use after it is buffered. This buffered BCLK* gets reinverted on each of the boards including the source board. The source board outputs the inverted clock on J1 and the second board receives it on J2. The second board transmits this clock to the third board on J1 and so on. On each board, jumper block W20 selects appropriate clock for the board operation. The source board uses internal clock and all the other boards (in a DAS or Concentrator mode) select external clock for the board operations. On each board the selected clock is buffered and then inverted again to obtain the correct clock polarity. This scheme provides minimum load on the clock signal passing between boards. The total clock signal load on each board is shared by three drivers BCLK1, BCLK2, and BCLK3.

DATA Synchronization Between Boards. Two or more FAST boards in a single AT chassis may be connected together to form a DAS or CON type of FDDI station. The data will flow from the FORMAC or the ENDEC on one board to the FORMAC or the ENEC on another board. The data setup and hold times for FORMAC and ENDEC must be met in order to achieve error free data transfer. The worst case timings will arise when data is sourced on R_bus by ENDEC on one board and is received by the FORMAC on RB_bus on another board. The data passing from one board to second is latched as soon as it arrives at the second board using local BCLK on the board. The same data is reclocked using BCLK* and then is made available to FORMAC and ENDEC. This scheme provides maximum data setup and hold time possible.

Clock Selection. A jumper arrangement has been provided on the FAST card to select clock from one of the three sources. Two separate sets of jumpers make primary and secondary clock selection. Jumper W11 provides a selection between ENDEC generated clock or Oscillator generated clock for the station operation. The second set of jumpers provides selection between on board clock and external clock for the station operation. It also provides termination resistors. The second set of jumpers have a default setting to use board clock but when a DAS or CON is constructed using two or more boards external clock and/or termination resistors can be selected.

TABLE 1

| BCLK Selection on FAST Card | |
|---|---|
| CLOCK SELECT | INSTALL JUMPER BETWEEN |
| ENDEC clock (BCLKOUT) | W11-2 and W11-1 |

TABLE 1-continued

| BCLK Selection on FAST Card | |
|---|---|
| CLOCK SELECT | INSTALL JUMPER BETWEEN |
| Oscillator clock | W11-2 and W11-3 |

TABLE 2

| Clock Selection for DAS or Concentrator Configurations | | |
|---|---|---|
| CLOCK SELECT | JUMPER | COMMENT |
| Internal Clock clock, also use the terminators. | W20-3 to W20-4 | This card sources |
| External clock | W20-5 to W20-6 | Use clock from other board, do not use terminators. |
| Source Termination | W20-1 to W20-2 | 150 Ohm terminator |
| End Termination | W20-7 to W20-8 | 150 Ohm terminator |

FDDI STATION CONFIGURATION

FIGS. 11A through 14C show various FDDI station types which can be configured using multiple FAST cards of the type described hereinabove. The information signal paths through FORMACs and ENDECs are configured under software control of the node processor. The reconfiguration multiplexers of the FAST cards for transmission of information signals between FAST cards are also configured under control of the node processor.

It is desirable that a single circuit board design be used for a FAST card. Therefore, certain integrated circuits can be present or deleted from the card to suit system requirements. For example, a dual attach configuration using a single MAC can eliminate one MAC integrated circuit from one of the two FAST cards. Other Supernet family components can also be eliminated as required. This presence or deletion of a particular SUPERNET integrated circuit form a card is referred to as populating or depopulating a card.

The internal data paths within a station are reconfigurable to provide a number of different station configurations. For a dual attach station, a THROUGH mode or a WRAP mode can be obtained. In addition, concentrators must have the ability to insert or to bypass attached stations. It is also desirable that a concentrator be able to connect an attached station to a MAC within the concentrator for diagnostic testing of the attached station while the network data path through the concentrator is maintained.

The components of the SUPERNET chip-set family provide data path selection capability to reconfigure data paths within a station. This capability is combined with the FAST card multiplexer selection functions described hereinabove provide a "building block" circuit board for configuration of the various station types. Since the data path configurations and reconfigurations focus specifically on the interconnections between the FORMAC and the ENDEC, FIGS. 11A through 14C have been simplified to show only certain components of the FAST cards for a network station. FIG. 6 shows the other components, while FIGS. 11A through 14C show only FORMACs, ENDECs, input latches, and output multiplexers for each of the cards.

FIG. 11A illustrates a dual attach, single MAC station in the THROUGH, alternatively THRU, mode as constructed from two cards. The second card is depopulated with respect to the FORMAC, RBC, DPC, and Buffer memory. The bold paths within the figure show the paths for the THROUGH mode. The multiplexers and input latches are shown illustratively.

FIG. 11B illustrates a dual attach, single MAC station in the WRAP A mode in which the primary ring data is channelled through the MAC and out onto the secondary ring. The secondary ring data is channelled out to the primary ring using a data path which includes only the ENDEC data paths.

FIG. 11C illustrates a dual attach, single MAC station in the WRAP B mode, as shown.

FIG. 12A illustrates a dual attach, dual MAC station in the THROUGH mode. Two MACs, RBCs, DPCs, and buffer memories are used. Both the primary and the secondary ring paths are in the THROUGH mode.

FIG. 12B illustrates an alternate THROUGH mode configuration.

FIG. 12C illustrates a dual attach, dual MAC station in the WRAP mode using both FORMACs.

FIG. 13A and the following figures illustrate a dual attach single MAC concentrator with three attachment cards. Each of the cards in all of the figures implement the same four functions as described below. The station is in the "THRU" mode. The states of an attachment card are as follows:

ON-LINE 1: An external station is configured into the network through an ENDEC. The FORMAC does not participate in this connection. If this ON-LINE scheme is used, the FORMAC, DPC, RBC and attendant logic can be depopulated on this attach card.

ON-LINE 2: An external station is configured into the network through the FORMAC. This allows the FORMAC statistic counters to be used for on-line diagnostics of the attached station.

DIAGNOSTIC. This mode allows uninterrupted network operation while the attach station and attachment card enjoined in a diagnostic dialog.

However, a semi-populated card (FORMAC and COUNTERS) could diagnose an operational ring as well as do lost and error count statistics.

BYPASS. In this mode, a station is not attached to the concentrator port (or powered down) and the network data path passes uninterrupted through the card.

FIG. 13B illustrates a dual attach, single MAC concentrator in the WRAP A mode.

FIG. 13C illustrates a dual attach, single MAC concentrator in the WRAP B mode.

FIG. 14A illustrates a dual attach, dual MAC concentrator in the THROUGH mode.

FIG. 14B illustrates a dual attach, dual MAC concentrator in an alternate THROUGH mode.

FIG. 14C illustrates a dual attach, dual MAC in the WRAP mode.

It is apparent from the above descriptions that, using the cards, or modules, a number of configurations and reconfigurations of data paths within station are available to accommodate various operational requirements or faults on a cable or system.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. Apparatus for configuring the data signal paths within a local area network station having dual access to both a primary ring and to a secondary ring of a dual-ring local area network, comprising:

a first media access controller MAC and a first encoder/decoder ENDEC, said first ENDEC having an input terminal coupled to the primary ring and having an output terminal coupled to the secondary ring;

a second media access controller MAC and a second encoder/decoder ENDEC, said second ENDEC having an input terminal coupled to the secondary ring and having an output terminal coupled to the primary ring;

first bus means for connecting signals between said first MAC and said first ENDEC;

second bus means for connecting signals between said second MAC and said second ENDEC;

first multiplexing means for selecting certain signals from said first bus means and for coupling said selected signals to said second bus means;

second multiplexing means for selecting certain signals from said second bus means and for coupling said selected signals to said first bus means;

means for controlling said first and said second multiplexing means to control connection of data signal paths within said local area network station through said first and said second MACs and ENDECs, to selectively configure the network station to operate in a predetermined operational mode.

2. The apparatus of claim 1 wherein said predetermined operational mode includes a through mode in which input signals on the primary ring are coupled out to the primary ring.

3. The apparatus of claim 1 wherein said predetermined operational mode includes a wrap mode in which input signals to the station on the primary ring are coupled out to the secondary ring.

4. The apparatus of claim 1 wherein:

said first bus means includes a first X BUS, which is a transmit bus for the first MAC, a first RA BUS, which is a receive bus for the first MAC, and a first RB/TB BUS bus, which is a receive bus for the first MAC and a transmit bus for the first ENDEC;

said second bus means includes a second X BUS which is a transmit bus for the second MAC, a second RA BUS, which is a receive bus for the second MAC, and a second RB/TB BUS bus, which is a receive bus for the second MAC and a transmit bus for the second ENDEC;

said first multiplexing means has an output bus to which are selectively connected signals from one of said first X, RA, RB/TB buses of said first bus means;

said second multiplexing means has an output bus to which are selectively connected signals from one of said second X, RA, RB/TB buses of said second bus means.

5. The apparatus of claim 4 including:

first input register means, which has input terminals coupled to the output bus of said second multiplexer means and which has output terminals coupled to said first RB BUS;

second input register means, which has input terminals coupled to the output bus of said first multiplexer means and which has output terminals coupled to said second RB BUS.

6. The apparatus of claim 1 including means for generating a local clock for said station and clock selection logic means for selecting between a local clock and an external clock source for said first MAC and ENDEC and for said second MAC and ENDEC.

7. The apparatus of claim 1 wherein said network station operates as a concentrator which couples signals on the primary ring to a secondary station.

8. The apparatus of claim 7 wherein said secondary station includes:

a third media access controller MAC and a third encoder/decoder ENDEC, said third ENDEC having an input terminal coupled to a tertiary ring and having an output terminal coupled to said tertiary ring;

tertiary bus means for connecting signals between said third MAC and said third ENDEC;

third multiplexing means for selecting certain signals from said third bus means;

means for controlling said third multiplexing means and for controlling the data paths through said third MAC and ENDEC to selectively configure the secondary station to operate in one of the following selected modes:

a first online mode in which input signals to the secondary station from the primary ring are coupled through said third MAC and through said third ENDEC, — a second online mode in which input signals to the secondary station from the primary ring are coupled only through said third ENDEC;

a third bypass mode in which input signals to the secondary station from the primary ring are coupled through said secondary station without passing through said third MAC or said third ENDEC; and a fourth diagnostic mode in which a diagnostic path to said tertiary ring is formed between said third MAC and said third ENDEC.

9. The apparatus of claim 1 wherein said first and said second multiplexing means includes tri-state buffers having their output terminals connected together.

10. The apparatus of claim 1 wherein the means for controlling the first and the second multiplexing means includes flipflop circuits having output terminals coupled to control terminals of said first and said second multiplexing means.

11. The apparatus of claim 1 wherein the network station is configured in a single MAC mode or operation to use only one of said first and said second MACs.

12. The apparatus of claim 1 wherein:

said first bus means and said first MAC and ENDEC are included in a first circuit module with other components elements of a network station;

said second bus means and said second MAC and ENDEC are included in a second circuit module with other component elements of a network station; and wherein said apparatus includes means for interconnecting said first and second circuit modules to form a dual-ring network station.

13. The apparatus of claim 12 wherein said first and said second circuit modules are circuit cards adapted to being plugged into a computer.

14. A modular system for configuring data signal paths within a local area network station, comprising:

a first module including:

a first media access controller MAC and a first encoder/decoder ENDEC;

first bus means for connecting signals between said first MAC and said first ENDEC;

first multiplexing means for selecting certain signals from said first bus means and for providing said selected signals on a first multiplex output bus;

means for controlling said first multiplexing means to control connection of data signal paths within said local area network station, which data signal paths are through said first MAC and ENDEC a second module having:

a second media access controller MAC and a second encoder/decoder ENDEC;

second bus means for connecting signals between second MAC and said second ENDEC;

second multiplexing means for selecting certain signals from said second bus means and for providing said selected signals on a second multiplex output bus;

means for controlling said second multiplexing means to control data signal paths within said local area network station, which data signal paths are through said second MAC and ENDEC;

first means for coupling said first multiplex output bus to said second bus means;

second means for coupling said second multiplex output bus to said first bus means.

15. The system of claim 14 wherein said first and said second modules are arranged to form a network station for a dual-ring local area network station including:

means for coupling a primary conductor of said dual-ring network to an input terminal of said first ENDEC;

means for coupling a secondary conductor of said dual-ring network to an output terminal of said first ENDEC;

means for coupling a secondary conductor of said dual-ring network to an input terminal of said second ENDEC;

means for coupling a primary conductor of said dual-ring network to an output terminal of said second ENDEC.

16. The system of claim 15 wherein said network station is configured to operate in a through mode in which input signals to the station from the primary ring are coupled out of the network station to the primary ring.

17. The system of claim 15 wherein said network station is configured to operate in a wrap mode in which input signals to the station from the primary ring are coupled out to the secondary ring.

18. The system of claim 14 wherein said network station formed by said first and said second modules is configured to operate as a concentrator for a secondary station wherein said secondary station includes a third module having:

a third media access controller MAC and a third encoder/decoder ENDEC;

third bus means for connecting signals between said third MAC and said third ENDEC;

third multiplexing means for selecting certain signals from said third bus means and for providing said selected signals on a third multiplex output bus;

means for controlling said third multiplexing means and for controlling the data paths through said third MAC and ENDEC;

wherein the first multiplex output bus is coupled to said third bus means;

wherein the third multiplex output bus is coupled to said second bus means.

19. The system of claim 18 including one or more modules similar to said third modules wherein said one or more modules are coupled in series between said first multiplex output bus and said second bus means.

20. The system of claim 14 wherein the first and the second coupling means each respectively include means for latching information coupled from said multiplex output buses.

* * * * *